Feb. 6, 1934. J. W. BROWN, JR 1,946,421
POSITIONING MEANS FOR DRILLING MACHINES
Filed Aug. 28, 1931 2 Sheets-Sheet 1

Cam elevated work table

Inventor:—
John W. Brown Jr.
by his Attorneys
Howson & Howson

Feb. 6, 1934.    J. W. BROWN, JR    1,946,421
POSITIONING MEANS FOR DRILLING MACHINES
Filed Aug. 28, 1931    2 Sheets-Sheet 2
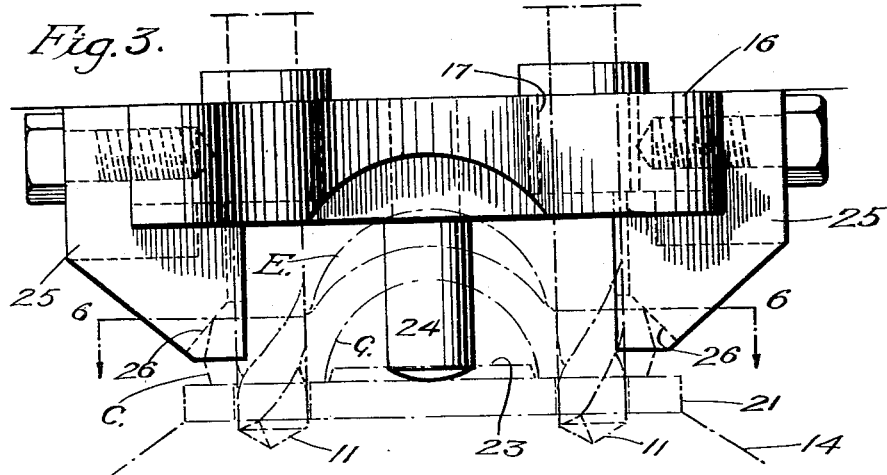
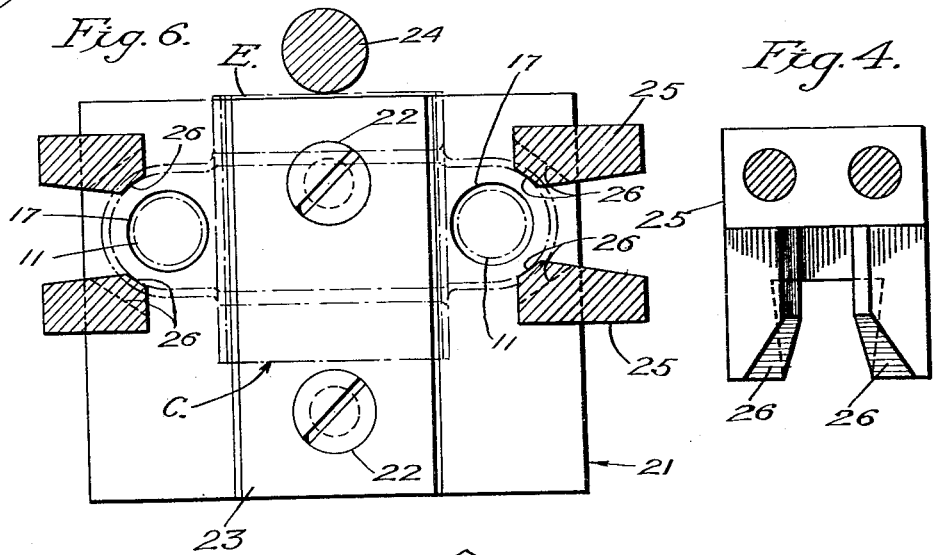
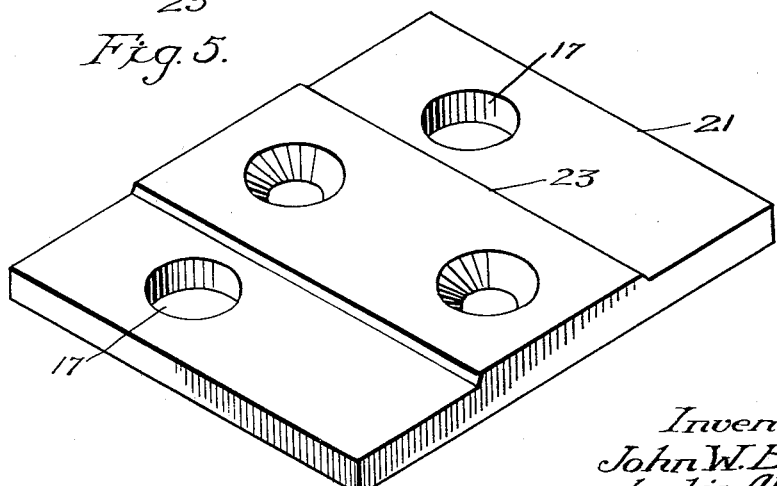
Inventor:—
John W. Brown Jr.
by his Attorneys Patented Feb. 6, 1934

1,946,421

UNITED STATES PATENT OFFICE 1,946,421

POSITIONING MEANS FOR DRILLING MACHINES

John Wilson Brown, Jr., Philadelphia, Pa.

Application August 28, 1931. Serial No. 560,011

4 Claims. (Cl. 77—63)

This invention relates to drilling apparatus, and more particularly to a centering apparatus for use in conjunction with automatic drilling machines of the type generally illustrated in my prior Patent No. 1,467,526, dated Sept. 11, 1923 for Drilling machine, wherein a plurality of drill spindles carried by a rotating carrier are aligned with work tables rotating with the carrier to drill or perform their cutting operations upon work disposed upon said tables. The work tables advance to bring the work into co-action with the drills by means of cams or similar mechanism.

An important object of the present invention is the provision of a means for initially approximately aligning the work with the drills or cutting tools of the carrier together with a secondary means for accurately centering the work which likewise acts as a guide for the drills or cutting tools.

A further and more specific object of the invention is the provision of a construction such that any work embodying opposed rounded edge or eared portions may be very accurately positioned for engagement by the drills or cutting elements.

These and other objects I attain by the construction shown in the accompanying drawings wherein, for the purpose of illustration, I have shown a preferred embodiment of my invention and wherein:

Fig. 3 is an enlarged front elevation of the work-positioning means;

Fig. 4 is a view of one of the cam elements removed;

Fig. 5 is a perspective view of the work seat; and

Fig. 6 is a sectional view showing the manner in which the cams co-act with the work to position the same.

Figure 1:
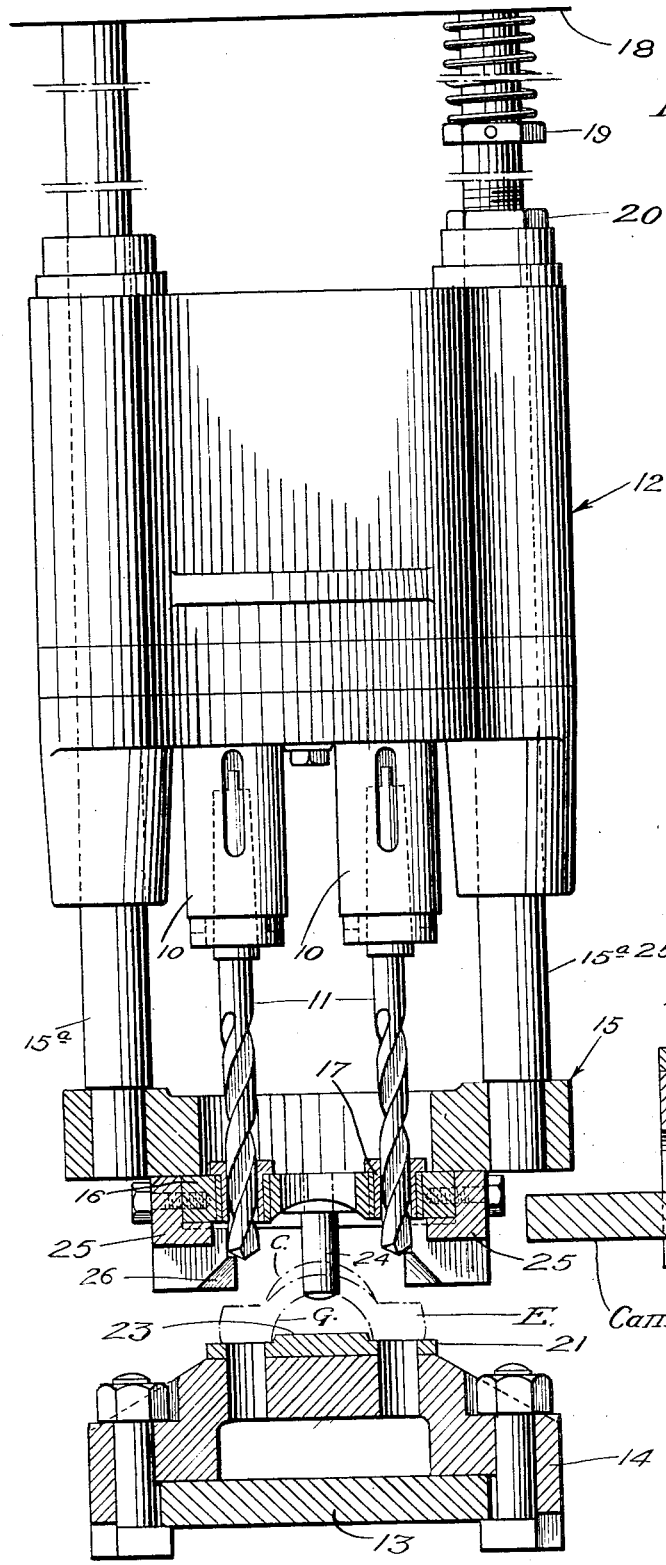
Fig. 1 is a front elevation of drilling apparatus embodying work-positioning means constructed in accordance with my invention.
Figure 2:
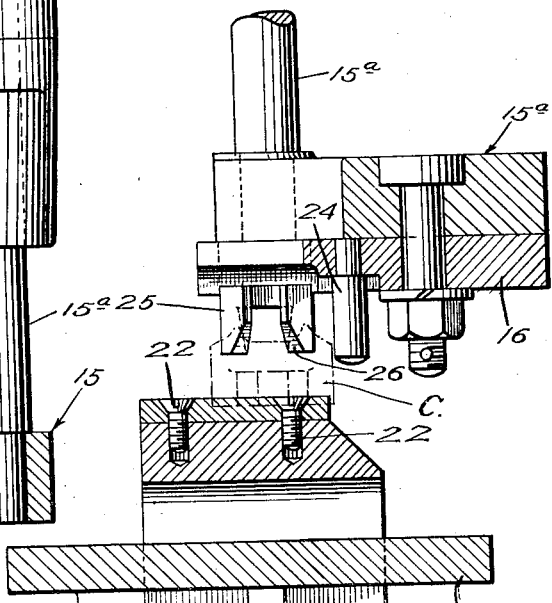
Fig. 2 is a fragmentary sectional view through the work-positioning means.

Referring now more particularly to the drawings, the numeral 10 generally designates drive spindles for cutting tools 11 at present illustrated as drills, these drive spindles being shown as mounted in a body 12 which may be the lower flange of drilling apparatus of the type illustrated in the prior patent hereinbefore referred to. The spindles are opposed by a cam-elevated work table 13 detachably receiving a jig 14. Associated with the drills 11 is a guiding means 15 of the type shown in my prior Patent No. 1,519,952, dated Dec. 16, 1924 for Work positioning device for drilling machines, which includes a plate 16 having guide openings 17 through which the cutting implements extend and further includes guide rods 15a slidably directed through the body 12 and a shelf or flange 18 overlying the body 12, at least one of these guide rods being surrounded by a spring extending between the shelf 18 and a stop 19 on the guide rod and serving to continually urge the guide rods and the drill guides downwardly until this downward movement is limited by a stop 20 likewise mounted on one of the guide rods and which comes into engagement with the body 12.

Apparatus of the type just described is employed in automatic or semi-automatic drilling or rotary cutting machinery to effect the desired operation through a reciprocation of the work table which brings the work into the sphere of action of the cutting tools. Many types of work are, however, difficult to accurately position with relation to the drilling mechanism, particularly where this mechanism is provided in multiple as in the present instance. Accuracy is especially difficult to secure in drilling a body such as a bearing cap "C" which has at its opposite sides projecting ears "E" through each of which one of the drills of the drilling mechanism is to be passed. If the drills are not accurately centered in their engagement with these ears the cap will be twisted when applied with the result that it is either useless or has such a thin coating of bearing material upon its bearing face that the bearing rapidly deteriorates and must be frequently replaced.

In accordance with my invention, I provide upon the jig 14 a work-supporting plate 21 which may be secured in position by screws or other suitable attaching means as indicated at 22 and which has upon its upper surface a rib or projection 23 adapted to loosely engage in the groove "G" of cap "C" and provide an approximate transverse positioning of this cap upon the work table. I further provide upon the plate 16 a downwardly projecting pin 24 against which the inner end of the cap "C" engages as the cap is slid inwardly upon the plate 21 with the projection 23 engaged in its groove "G". The lower end of this pin is, at the time of maximum separation of work table 13 and the drilling or cutting implements 11, so positioned that it will engage the rear end of the cap and limit inward movement thereof at the time when the ears "E" of the cap are approximately aligned with the drills.

I then secure upon the plate 16, or with relation to this plate a pair of cam elements 25, these cam elements each including cam faces 26 which diverge from one another downwardly in directions both transverse and longitudinal to the plate 16 and, accordingly, to the jig 14 and the cap "C" which has been approximately positioned thereon by the mechanisms hereinbefore described. When the table 13 approaches the drills, the ears "E" of cap "C" are brought into engagement with these cam faces, as more clearly shown in Fig. 6 and are thereby simultaneously shifted so that the ear is centralized between the pair of cams 25 at each side of the guide plate 16 and centered therebetween and the cap is bodily shifted transversely so that it is centralized between the pairs of cams at opposite sides of the plate. The ears are thus accurately positioned in alignment with the drills 11 which, during continued movement of the cam-elevated work table come into engagement with the cap to perform the drilling operation. It will, of course, be obvious that the yieldable mounting of the drill guide mechanism 15 will permit this guide to elevate in response to continued elevation of the table 13 while yieldably maintaining the engagement of the cam elements with the work and the accurate positioning of the work.

Since the construction hereinbefore set forth is, obviously, capable of a certain range of change and modification without in any manner departing from the spirit of the invention, I do not wish to be understood as limiting myself thereto except as hereinafter claimed.

I claim:

1. The combination with a rotary cutting mechanism including a rotary cutting implement, a work table and means for shifting one of said cutting implements and work table to bring work carried by the table into the sphere of action of the cutting implement, of a yieldable guide for the cutting implement yielding in the direction of such movement, means associated with the work table to engage work placed thereon and approximately transversely align the same with the cutting implement, means upon said yieldable element to engage work placed upon the work table and approximately longitudinally align the work with the cutting implement, and means on said yieldable member engaging work upon the work table during approach of the work table and cutting implement for accurately positioning the work both longitudinally and transversely for engagement by the cutting implement.

2. The combination with a rotary cutting mechanism including a rotary cutting implement, a work table and means for shifting one of said cutting implements and work table to bring work carried by the table into the sphere of action of the cutting implement, of a yieldable guide for the cutting implement yielding in the direction of such movement, means associated with the work table to engage work placed thereon and approximately transversely align the same with the cutting implement, means upon said yieldable element to engage work placed upon the work table and approximately longitudinally align the work with the cutting implement, and means on said yieldable member engaging work upon the work table during approach of the work table and cutting implement for accurately positioning the work for engagement by the cutting implement, comprising cam elements adapted to engage the work at diametrically opposed points, said cam elements each comprising a pair of cam faces, said cam faces diverging from one another toward the work table and toward a centrally disposed point upon said diameter.

3. The combination with a rotary cutting mechanism including a rotary cutting implement, a work table and means for relatively shifting the cutting implement and work table to bring work carried by the table into the sphere of action of the cutting implement, of means for guiding hand-inserted work into proper position upon said work table comprising means on the table to engage work and approximately align the same transversely with the cutting implement, the work being longitudinally shiftable along said transverse aligning means, means to limit movement of the work along the transverse aligning means when the work is approximately longitudinally aligned with the cutting implement, and a yieldable member having cams disposed out of the path of the work when the table and cutting implement are separated and engaging the work as the cutting implement and table approach one another to accurately position the work for and prior to engagement thereof by the cutting implement.

4. The combination with a rotary cutting mechanism including a rotary cutting implement, a work table and means for relatively shifting the cutting implement and work table to bring work carried by the work table into the sphere of action of the cutting implement, of apparatus for aligning hand-inserted work having a slot therein with the cutting implement, said apparatus including a rib to loosely engage said slot and approximately align the work with the cutting implement in a direction transverse to said slot, the work being movable along said rib, a stop to limit movement of the work along said rib when the work is approximately aligned with the cutting implement in a direction longitudinal to the slot, and means operated by approach of the work table and cutting implement for accurately aligning the work longitudinally and transversely with the cutting implement.

JOHN WILSON BROWN, Jr.